(12) United States Patent
Starzmann et al.

(10) Patent No.: US 9,132,718 B2
(45) Date of Patent: Sep. 15, 2015

(54) SHADING DEVICE FOR A GLASS SURFACE REGION OF A MOTOR VEHICLE

(71) Applicants: Bernd Starzmann, Hohengehren (DE); Jan Lekar, Ostfildern (DE); Michele Tina, Ostfildern (DE)

(72) Inventors: Bernd Starzmann, Hohengehren (DE); Jan Lekar, Ostfildern (DE); Michele Tina, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/317,342

(22) Filed: Jun. 27, 2014

(65) Prior Publication Data
US 2015/0001879 A1    Jan. 1, 2015

(30) Foreign Application Priority Data
Jun. 28, 2013   (DE) .......................... 10 2013 212 549

(51) Int. Cl.
B60J 1/20    (2006.01)

(52) U.S. Cl.
CPC .............. B60J 1/2063 (2013.01); B60J 1/2022 (2013.01); B60J 1/2044 (2013.01); B60J 1/2047 (2013.01); B60J 1/2086 (2013.01)

(58) Field of Classification Search
CPC ...... B60J 1/2013; B60J 1/2016; B60J 1/2019; B60J 1/2022; B60J 1/2025; B60J 1/2027; B60J 1/203; B60J 1/2036; B60J 1/2044; B60J 1/20047; B60J 1/2052; B60J 1/2061; B60J 1/2083; B60J 1/2075; B60J 1/208; B60J 1/20; B60J 3/005; B60J 3/0286; B60J 11/08; B60J 11/025; B60J 11/0256

USPC .................................................. 296/152, 97.8
See application file for complete search history.

(56) References Cited

U.S. PATENT DOCUMENTS 5,605,370 A * 2/1997 Ruiz .............................. 296/152
6,347,825 B2 * 2/2002 Seel et al. ..................... 296/97.8
(Continued)

FOREIGN PATENT DOCUMENTS

DE     20 2007 016 325 U1    3/2008
EP         2 017 107 B1        1/2009

OTHER PUBLICATIONS

German Examination Report issued in German Application No. 10 2013 212 549.6 dated Mar. 18, 2014 (4 pages).

*Primary Examiner* — Gregory Blankenship
(74) *Attorney, Agent, or Firm* — Flynn, Thiel, Boutell & Tanis, P.C.

(57) ABSTRACT

A shading device for a glass surface region of a motor vehicle having a flexible shading formation movably supported between a rest position compactly stored in a vehicle interior and a tensioned shading position. The shading device includes a dimensionally stable draw-out profile member movable by a linearly movable lifting rod into the shading position or the rest position. A drive unit for lifting or lowering the lifting rod is associated with the lifting rod.
The draw-out profile member has a support receiving member, which is closed upwards in the lifting direction and which is open downwards, for receiving and releasing the lifting rod in accordance with the movement direction of the lifting rod. A locking device is associated with the draw-out profile member and secures the draw-out profile member in the shading position so as to be fixed to a vehicle.

10 Claims, 4 Drawing Sheets

(56) References Cited

U.S. PATENT DOCUMENTS

| | | | |
|---|---|---|---|
| 6,523,880 B1* | 2/2003 | Yako | 296/97.1 |
| 6,848,493 B1* | 2/2005 | Hansen et al. | 160/370.22 |
| 2008/0157559 A1* | 7/2008 | Ercolano | 296/152 |
| 2009/0020236 A1 | 1/2009 | Hansen | |
| 2009/0078379 A1* | 3/2009 | Hansen | 160/265 |
| 2009/0079222 A1 | 3/2009 | Hansen | |
| 2012/0049564 A1* | 3/2012 | Haase et al. | 296/97.8 |
| 2015/0001879 A1* | 1/2015 | Starzmann et al. | 296/152 |

\* cited by examiner

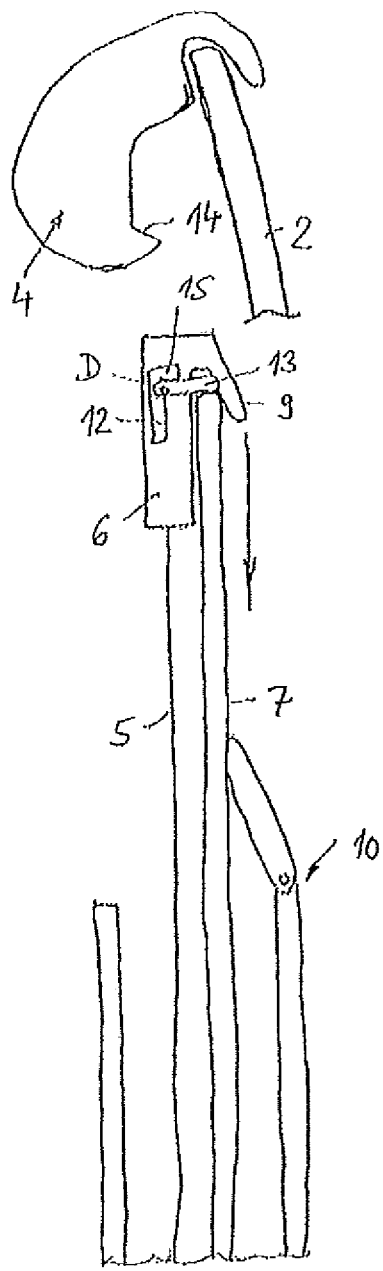
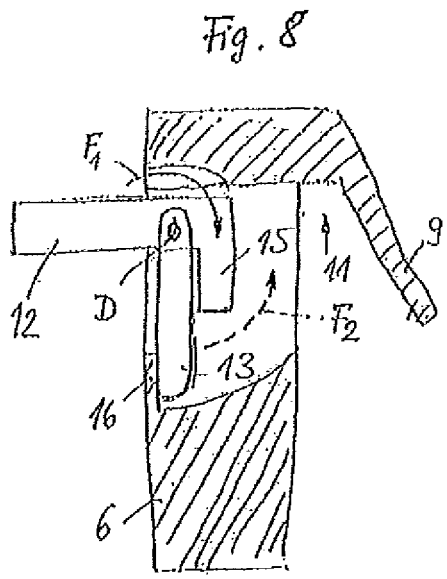
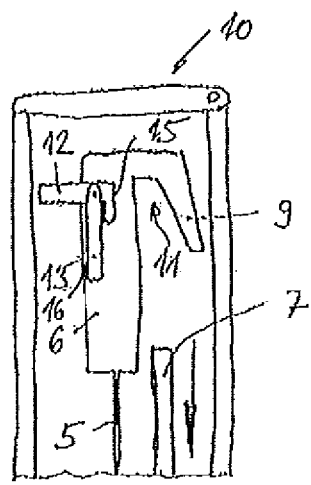
Fig. 6
Fig. 8
Fig. 7

SHADING DEVICE FOR A GLASS SURFACE REGION OF A MOTOR VEHICLE

CROSS-REFERENCE TO RELATED APPLICATIONS

This application claims the priority of the German patent application DE 102013212549.6 the disclosure of which is hereby incorporated into this application.

FIELD OF THE INVENTION

The invention relates to a shading device for a glass surface region of a motor vehicle, in particular for a side window of a private motor vehicle, having a flexible shading formation which is movably supported between a rest position in which the shading formation is compactly stored in a vehicle interior and a tensioned shading position. The shading formation is provided at the front end region thereof at the front in the tensioning direction with a dimensionally stable draw-out profile member which can be moved by means of a linearly movable lifting rod into the shading position or the rest position of the shading formation, a drive unit for lifting or lowering the lifting rod being associated with the lifting rod.

BACKGROUND OF THE INVENTION

Such a shading device is known from EP2017107 B1. The known shading device is provided for a side window of a private motor vehicle. The shading device comprises a flexible shading formation which is retained so as to be able to be wound and unwound on a winding shaft which is rotatably supported in a door trim under the side window. In a shading position, the shading formation is tensioned upwards parallel with the side window at the vehicle interior side. The shading formation has at the front end region thereof at the front in the tensioning direction a dimensionally stable draw-out profile member on which a lifting rod acts. The lifting rod is supported in a linearly movable manner in the vertical direction of the vehicle in the door trim at the vehicle side. A drive unit in the form of a spring drive or a drive having a different energy source is used to move the lifting rod which is fixed to the draw-out profile member together with the draw-out profile member from the rest position into the shading position of the draw-out profile member and the shading formation.

SUMMARY OF THE INVENTION

An object of the invention is to provide a shading device of the type mentioned in the introduction which allows uniform shading in the shading position of the shading formation and a uniform field of vision from the vehicle interior to the glass surface region.

This object is achieved in that the draw-out profile member has a support receiving member, which is closed upwards in the lifting direction and which is open downwards, for receiving and releasing the lifting rod in accordance with the movement direction of the lifting rod, and in that there is associated with the draw-out profile member a locking device which secures the draw-out profile member in the shading position so as to be fixed to a vehicle and which is operationally connected to the lifting rod in such a manner that it locks or releases the draw-out profile member in accordance with an introduction of the lifting rod into the support receiving member or lowering of the lifting rod from the support receiving member in the shading position. As a result of the solution according to the invention, the lifting rod projects into the field of vision in the region of the shading formation only in the event of a lifting or lowering movement of the draw-out profile member. In the tensioned shading position, however, the lifting rod is moved away from the draw-out profile member and can be stored in a non-visible manner. In the shading position of the shading formation, therefore, the lifting rod does not either impair the shading face or disrupt the field of vision from the vehicle interior through the tensioned shading formation to the glass surface region. The solution according to the invention is suitable in a particularly advantageous manner for use in a side window, that is to say, a lateral pane, of a private motor vehicle. The solution according to the invention is also provided in the same manner for a rear window of a private motor vehicle or for other side or front window portions of motor vehicles. The solution according to the invention is also suitable for shading a roof-side glass surface region of a motor vehicle. The term "raising or lowering the lifting rod" is intended to be generally interpreted in this regard because it includes both lifting movements of the lifting rod with main direction components in a vertical direction of the vehicle and lifting movements with main direction components in the longitudinal direction of the vehicle or transverse direction of the vehicle. The locking device is preferably of mechanical form. It is also possible to configure the locking device so as to be electromagnetic. The mechanical locking device may be configured in the manner described in greater detail below or it may comprise a push/push function in the manner of the ballpoint pen principle or a slotted control member function. The locking device is advantageously integrated in the draw-out profile member. In other embodiments of the invention, the locking device may also be arranged at the vehicle side in the region of the shading position of the draw-out profile member. The shading position of the draw-out profile member is advantageously in an upper door frame region of the side door for shading a side window of a side door of a private motor vehicle.

In an embodiment of the invention, the locking device comprises a mechanical locking catch arrangement which is integrated in the draw-out profile member and which cooperates with a retention profiling fixed to the vehicle in the shading position of the draw-out profile member. As a result of the integration of the locking catch arrangement in the draw-out profile member, no movable members have to be received at the vehicle side, in particular in the region of a side door frame. Instead, it is simply necessary to provide a corresponding retention profiling which is fixed to the vehicle and which is configured in particular as an undercut in the region of an upper door frame of a side door or in the roof region above a side window, if the side window is not provided in a side door. The retention profiling which is fixed to the vehicle may also be provided at a corresponding edge or frame portion of the glass surface region in the case of other glass surface regions which extend approximately horizontally.

In another embodiment of the invention, the locking catch arrangement comprises a locking catch which cooperates with the retention profiling which is fixed to the vehicle and a carrier catch which is connected to the locking catch and which projects into a movement path of the lifting rod in accordance with the position of the locking catch and which cooperates with the lifting rod. As a result of the connection of the carrier catch with respect to the locking catch, it is possible to achieve locking or release of the draw-out profile member relative to the retention profiling which is fixed to the vehicle in the shading position of the draw-out profile member in accordance with the position of the lifting rod. The locking catch and the carrier catch are movable independently of each other and are force-coupled to each other simply for specific movement portions.

In another embodiment of the invention, the locking catch and the carrier catch are supported on the draw-out profile member so as to be pivotably movable and are acted on with torque by two separate spring arrangements in mutually opposing directions. The spring arrangements which may be provided are preferably leg springs which are arranged coaxially relative to a corresponding pivot axis of the locking catch and the carrier catch.

In another embodiment of the invention, the carrier catch and the locking catch are supported in a pivotably movable manner on a common axis. This results in a particularly compact but nevertheless operationally reliable structure of the locking catch arrangement.

In another embodiment of the invention, a torque of the spring arrangement of the locking catch is configured to be greater in terms of value than an opposingly directed torque of the spring arrangement for the carrier catch. The resilient force of the locking catch therefore retains the carrier catch in an end position as long as no other types of external loads act on the carrier catch or the locking catch.

The locking catch and the carrier catch project in corresponding end positions or intermediate positions beyond edge contour portions of the draw-out profile member in order to produce striking or stopping of the locking catch and/or the carrier catch against members which are movable or fixed to the vehicle during corresponding movement operations, and thereby to achieve the introduction of corresponding pivot movements of the locking catch and/or the carrier catch.

In another embodiment of the invention, the locking catch and the carrier catch have mutually complementary stop faces which bring about a mutually positive-locking pivot movement of the locking catch and carrier catch in accordance with the position of the locking catch and/or carrier catch. A desired compulsory carrier function can thereby be achieved between the locking catch and the carrier catch.

In another embodiment of the invention, a stop which limits the pivot movement thereof in the rotation direction of the torque action on the draw-out profile member is associated with the carrier catch. The pivot movement of the carrier catch is thereby limited in a positive-locking manner in the rotation direction of the resilient loading.

BRIEF DESCRIPTION OF THE DRAWINGS

Other advantages and features of the invention will be appreciated from the claims and the following description of a preferred exemplary embodiment of the invention which is illustrated with reference to the drawings.

FIGS. 2 to 7 are schematic cross-sections, drawn to an enlarged scale, through the shading device according to FIG. 1 in various operating positions of the shading device.

FIG. 8 is a cross-section, drawn to an enlarged scale, of a cutout of a draw-out profile member of the shading device according to FIGS. 1 to 7.

DETAILED DESCRIPTION

Figure 1:
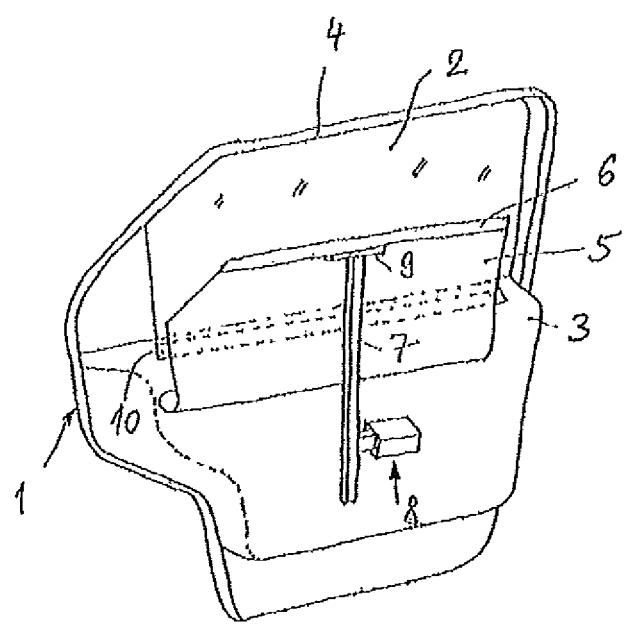
FIG. 1 is a schematic view of a side door of a private motor vehicle with which an embodiment of a shading device according to the invention is associated.
Figure 3:
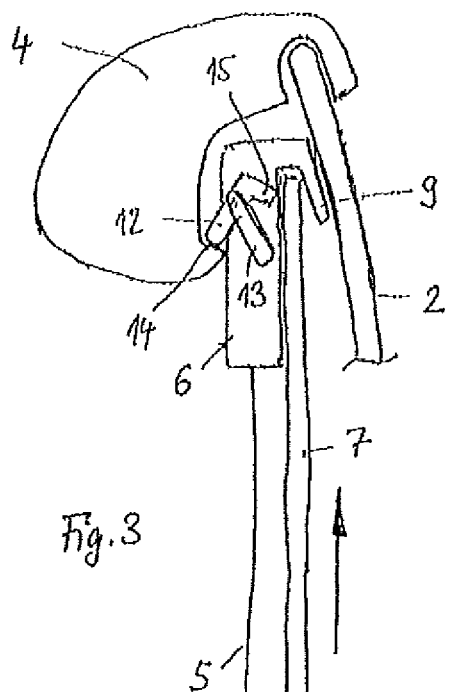

A shading device according to FIGS. 1 to 8 is provided for a rear side door 1 of a private motor vehicle and serves to shade a side window 2 of the side door 1. The shading device is arranged at the vehicle interior side and has a flexible, web-like shading formation 5 which is supported so as to be able to be wound and unwound on a winding shaft (not described in greater detail) in a housing 10 in the region of an internal door trim 3. The housing 10 is retained inside the internal door trim 3 so as to be fixed to the door and therefore fixed to the vehicle. At the level of a bodywork region directly below the side window 2, the housing 10 is provided with a pivotably movable cover which closes or opens an upwardly open side of the housing 10 in accordance with the position of the shading formation 5. The cover of the housing 10 is resiliently loaded in the closing direction.

The shading formation 5 is movably supported between a rest position in which the shading formation 5 is wound on the winding shaft and in which the shading formation 5 is recessed within the housing 10, and a shading position in which the side window 2 is covered. In the shading position, the shading formation 5 is tensioned in the direction towards an upper door frame region 4. A return spring which acts in the winding direction is associated with the winding shaft in order to achieve a permanent tensioning function on the shading formation 5 in the winding direction. A dimensionally stable draw-out profile member 6 is provided on a front end region of the shading formation 5, which region is at the front in the tensioning direction, and is centrally provided with a receiving region 9. The receiving region 9 has a pocket-like support receiving member 11 which has a closed base upwards in the vertical direction of the vehicle and which is configured so as to be open downwards. The support receiving member 11 tapers in terms of its cross-section from the open side towards the base in an upward direction. This is achieved by an inclined centering member which is not described in greater detail and which defines a right-hand side wall of the support receiving member 11 in the illustrations according to FIGS. 2 to 8.

The draw-out profile member 6 can be moved into the shading position by means of a dimensionally stable lifting rod 7. The lifting rod 7 is arranged approximately at half of the width of the shading formation 5 and the draw-out profile member 6 in the region of the internal door trim 3 of the side door 1 and is supported in a linearly movable manner at the door side between a lowered rest position according to FIGS. 2 and 7 and a deployed operating position according to FIGS. 3 and 5. The lifting rod 7 is supported so as to be hidden inside the internal door trim 3 and is deployed upwards in the event of a lifting movement through the housing 10. The lifting rod 7 is movable in a lifting manner upwards and downwards by means of an electric drive unit 8. In embodiments of the invention which are not illustrated, the drive unit is configured in an electropneumatic, electromagnetic, electrohydraulic or purely mechanical manner by means of a spring drive.

The lifting rod 7 can be moved separately from the draw-out profile member 6 as described in greater detail below. The lifting rod 7 is introduced into the support receiving member 11 of the draw-out profile member 6 and thus moves the draw-out profile member 6 from its rest position into the shading position or moves the draw-out profile member 6 back into the rest position from the shading position again.

The draw-out profile member 6 is provided with a locking catch arrangement 12, 13 which is supported centrally in the draw-out profile member 6 at the height of the receiving region 9. The locking catch arrangement 12, 13 is supported in the region of a recess of the draw-out profile member 6, which recess is open transversely relative to the lifting direction of the draw-out profile member 6 from the support receiving member 11 as far as the opposite front side of the draw-out profile member 6 (see FIG. 8).

Figure 2:
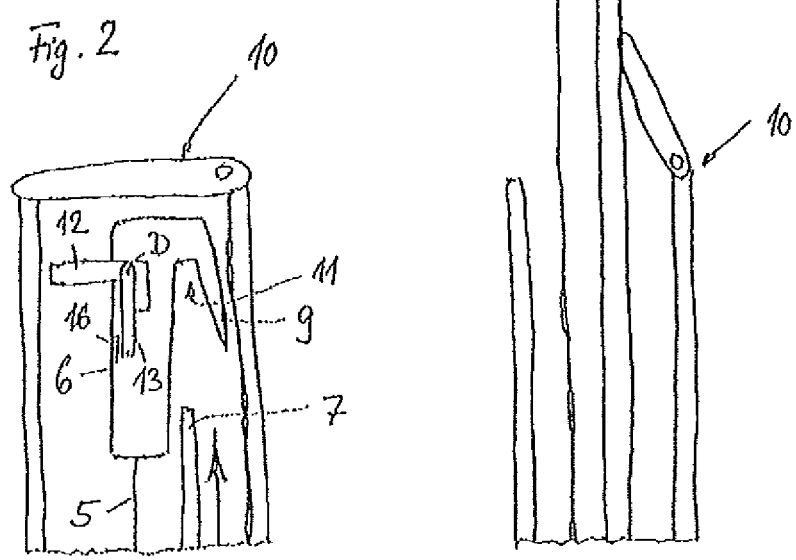
Figure 4:
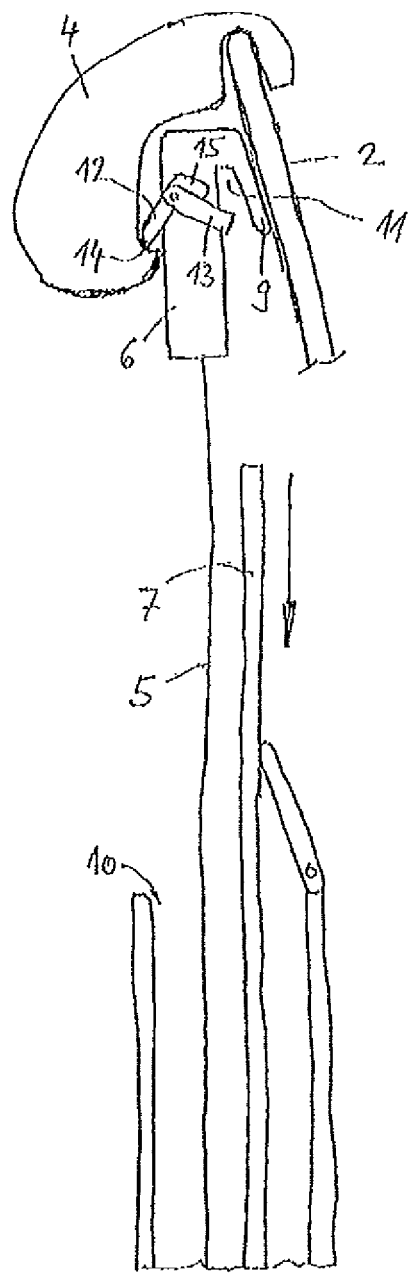
Figure 5:
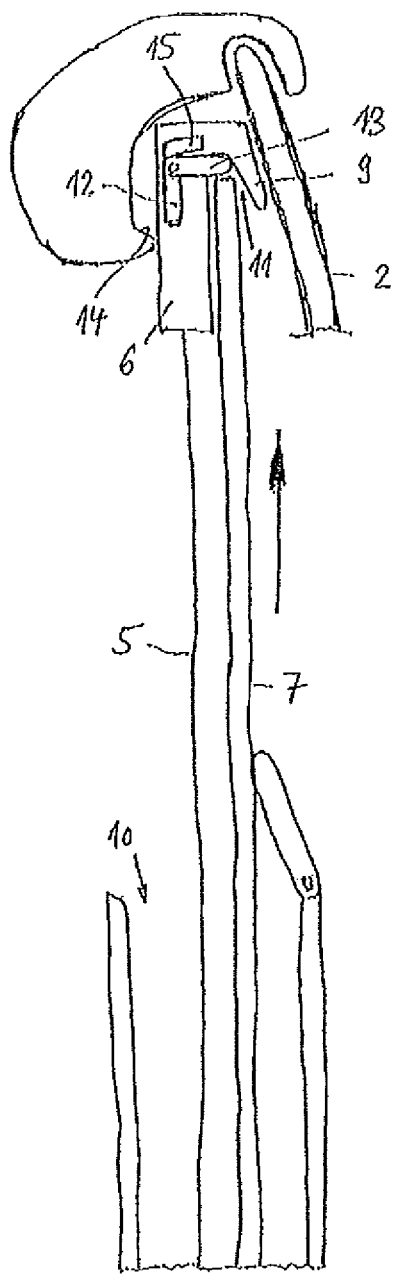

The locking catch arrangement comprises a locking catch 12 and a carrier catch 13 which are supported so as to be pivotably movable independently of each other about a common rotation axis D. The locking catch 12 and the carrier catch 13 are arranged so as to be axially adjacent to each other—when viewed in the longitudinal direction of the draw-out profile member 6—and are supported so as to be pivotably movable on the common rotation axis D. As indicated with reference to FIG. 8 by the circular-arc-like arrows F1 and F2, both the locking catch 12 and the carrier catch 13 are acted on with torque by a spring arrangement, respectively. The spring arrangement associated with the locking catch 12 according to FIG. 8 acts on the locking catch 12 in the clockwise direction, whereas the spring arrangement of the carrier catch 13 applies a torque to the carrier catch 13 in accordance with the illustrated arrow F2 in the counter-clockwise direction. The torque of the spring arrangement F1 of the locking catch 12 is greater in terms of value than the torque of the spring arrangement F2 which acts in the opposite direction on the carrier catch 13. The two spring arrangements F1 and F2 are in the form of leg springs coaxial with respect to the rotation axis D, the arrangements being supported with one leg on the corresponding locking catch 12 or carrier catch 13 and with the other leg in a fixed manner on the draw-out profile member 6. The locking catch 12 has a lever extension 15 which projects at right-angles from a front end and which projects into the pivot movement path of the carrier catch 13 so that complementary stop faces are produced between the lever extension 15 and the carrier catch 13. Since the torque of the spring arrangement F1 of the locking catch 12 is greater in terms of value than the oppositely directed torque of the spring arrangement F2 of the carrier catch 13, the locking catch 12 also carries the carrier catch 13 in the rotation direction thereof in the clockwise direction by means of the lever extension 15 as long as no external torque loads act on the locking catch 12. A stationary stop 16, against which the carrier catch 13 is kept pressed by the resilient force of the spring arrangement F1 of the locking catch 12 as long as no other forces act on the locking catch 12, is associated with the carrier catch 13 on the draw-out profile member 6. In this rest position of the carrier catch 13 according to FIG. 8, the locking catch 12 projects outwards with the lever side thereof remote from the lever extension 15—in relation to the rotation axis D—approximately at right-angles beyond a lateral outer contour of the draw-out profile member 6, as can be seen in FIGS. 2, 7, and 8. FIGS. 2, 7 and 8 consequently illustrate the unloaded rest position of the locking catch arrangement 12, 13.

In the region of the upper door frame 4, there is provided at the height of the receiving region 9 and therefore at the height of the locking catch 12 a vehicle-side retention profiling 14 which is configured as an undercut, against which the locking catch 12 can be supported in the shading position of the draw-out profile member 6.

As soon as the lifting rod 7 according to FIG. 2 is moved upwards from the rest position thereof in the direction of the arrow, it carries the draw-out profile member 6 out of the rest position thereof inside the housing 10 via the support receiving member 11 in the receiving region 9. The cover of the housing 10 is pivoted upwards by the upward displacement of the lifting rod 7 and the draw-out profile member 6 and the lifting rod 7 are deployed upwards. As a result, the shading formation 5 is necessarily also tensioned counter to the return force of the winding spring of the winding shaft. As soon as the draw-out profile member 6 is moved towards the profiling 14 of the door frame 4 from below to such an extent that an upper side of the perpendicularly outwardly projecting locking catch 12 moves into abutment against a lower side of the profiling 14, an additional lifting movement of the lifting rod 7 and the draw-out profile member 6 necessarily brings about inward pivoting of the locking catch 12, whereby the carrier catch 13 is released from the lever extension 15 and adjoins the lifting rod 7 at the inner side in the counter-clockwise direction. As soon as the draw-out profile member 6 is lifted upwards by an additional lifting movement of the lifting rod 7 into awe receiving member which is formed inside the door frame 4 to such an extent that the locking catch 12 has overrun the retention profiling 14 in an upward direction, the locking catch 12 necessarily pivots outwards, as a result of the resilient force of the spring arrangement F1 acting in the clockwise direction, and is supported from above in a positive-locking manner on the retention profiling 14. At the same time, an outer side of the receiving region 9 has moved into abutment with an inner side of the side window 2 so that the draw-out profile member 6 is retained in a stable manner in the receiving member of the door frame 4 between the retention profiling 14 and the inner side of the side window 12. The lifting rod 7 can now be moved downwards without the draw-out profile member 6 also being carried. The locking catch 12, the retention profiling 14 and the abutment face of the receiving region 9 at the inner side of the side window 2 secure the draw-out profile member 6 in the shading position. The shading formation 5 remains tensioned because the return force of the winding spring of the winding shaft acts permanently on the shading formation 5. After the lifting rod 7 has been lowered, the carrier catch 13 necessarily pivots outwards in the counter-clockwise direction until the carrier catch 13 again moves into abutment with the lever extension 15 in a positive-locking manner.

In order to be able to guide the draw-out profile 1 member 6 back out of the shading position and into the rest position within the housing 10 again, the lifting rod 7 is again deployed upwards out of its rest position (FIG. 5) and is again introduced into the support receiving member 11. The carrier catch 13 projects with the free front end region thereof into the support receiving member 11 and is necessarily pivoted upwards in the counter-clockwise direction during the lifting movement of the lifting rod 7 upwards according to FIG. 5. The lever extension 15 is thereby also necessarily pivoted in the counter-clockwise direction, whereby the locking catch 12 pivots inwards and is released from the undercut on the retention profiling 14. As long as the lifting rod 7 is supported in the support receiving member 11 at the upper side, the carrier catch 13 is also retained in a stable manner in this position by the locking catch 12 (by means of the lever extension 15 which is in a release position in which the locking catch 12 does not project beyond the lateral outer contour of the draw-out profile member 6). The lifting rod 7 can now be lowered by a corresponding reversal of the direction of the drive unit 8, whereby, as a result of the return force of the winding spring and the resultant tensioning of the shading formation 5, the draw-out profile member 6, which is supported on the upper front end of the lifting rod 7, is also necessarily lowered. The lifting rod 7 is lowered, along with the draw-out profile member 6, until the draw-out profile member 6 is completely introduced into the housing 10 and the cover of the housing 10 has been closed again. The receiving region 9 is configured in such a manner that, when the draw-out profile member 6 is lowered, the receiving region 9 does not become jammed on the cover of the housing 10. In the rest position of the draw-out profile member 6, the lifting rod 7 is then lowered further, whereby the carrier catch 13 is again released. The locking catch 12 thereby necessarily pivots again, as a result of the greater torque of the spring arrangement F1, into the rest position in which the locking catch 12 protrudes outwards at right-angles from the lateral outer contour of the draw-out profile member 6. The carrier catch 13 has been forced against the stationary stop 16 on the draw-out profile member 6 by means of the lever extension 15 so that the stable non-loaded rest state of the locking catch arrangement has been reached again. A repeated deployment operation is carried out similarly to the operation already described above.

The invention claimed is:

1. A shading device for a glass surface region of a motor vehicle including a flexible shading formation movably supported between a rest position in which the shading formation is compactly stored in a vehicle interior and a tensioned shading position, the shading formation having a front end region located at a front of the shading formation in the tensioning direction, the front end region including dimensionally stable draw-out profile member movable by a linearly movable lifting rod into the shading position or the rest position, a drive unit for lifting or lowering the lifting rod, wherein the draw-out profile member has a support receiving member which is closed upwards in a lifting direction and open downwards, the support receiving member receiving and releasing the lifting rod in accordance with a movement direction of the lifting rod, the shading device further including a locking device associated with the draw-out profile member, the locking device securing the draw-out profile member in the shading position so as to be fixed to the vehicle and being operationally connected to the lifting rod such that the locking device locks or releases the draw-out profile member in accordance with an introduction of the lifting rod into the support receiving member or lowering of the lifting rod from the support receiving member in the shading position.

2. The shading device according to claim 1, wherein the locking device comprises a mechanical locking catch arrangement, the locking catch arrangement being integrated in the draw-out profile member and cooperating with a retention profiling in the shading position of the shading formation, the retention profiling being fixed to the vehicle.

3. The shading device according to claim 2, wherein the locking catch arrangement comprises a locking catch cooperating with the retention profiling and a carrier catch connected to the locking catch and projecting into a movement path of the lifting rod in accordance with the position of the locking catch, the carrier catch cooperating with the lifting rod.

4. The shading device according to claim 3, wherein the locking catch and the carrier catch are supported on the draw-out profile member so as to be pivotably movable and are acted on with torque in mutually opposing directions by two separate spring arrangements.

5. The shading device according to claim 4, wherein the carrier catch and the locking catch are supported in a pivotably movable manner about a common rotation axis.

6. The shading device according to claim 4, wherein a torque of the spring arrangement of the locking catch is configured to be greater in terms of value than an opposingly directed torque of the spring arrangement of the carrier catch.

7. The shading device according to claim 3, wherein the locking catch and the carrier catch have mutually complementary stop faces which bring about a mutually positive-locking pivot movement of the locking catch and the carrier catch in accordance with the position of the locking catch and/or the carrier catch.

8. The shading device according to claim 3, wherein the locking catch and the carrier catch are supported on the draw-out profile member in a rotationally movable manner.

9. The shading device according to claim 8, wherein the draw-out profile includes a stop disposed to limit rotational movement of the carrier catch.

10. The shading device according to claim 6, wherein the draw-out profile member includes a stop disposed to limit pivoting movement of the carrier catch in a rotational direction caused by the torque of the spring arrangement of the locking catch.

* * * * *